United States Patent [19]

Graf et al.

[11] Patent Number: 4,822,427
[45] Date of Patent: Apr. 18, 1989

[54] OPEN-GRADE ASPHALT EMULSION MIXES

[75] Inventors: Peter E. Graf, Orinda; Steven J. Agazzi, Walnut Creek; Eugene J. Vanderzanden, Piedmont, all of Calif.

[73] Assignee: Chevron Research Company, San Francisco, Calif.

[21] Appl. No.: 926,035

[22] Filed: Oct. 31, 1986

[51] Int. Cl.$^4$ .................. C09D 3/387; C09D 3/24
[52] U.S. Cl. ................... 106/502; 106/401; 106/448; 106/499; 252/311.5
[58] Field of Search .......... 106/273 R, 273 N, 277 R, 106/278, 284; 252/311.5

[56] References Cited

U.S. PATENT DOCUMENTS

| | | | |
|---|---|---|---|
| 3,518,101 | 6/1970 | Gzemski et al. | 106/277 |
| 3,728,278 | 4/1973 | Tramelli | 106/277 |
| 3,738,852 | 6/1973 | Doi et al. | 106/277 |
| 3,859,227 | 1/1975 | Dwyer | 106/277 |
| 3,867,162 | 2/1975 | Elste, Jr. | 106/277 |
| 3,957,524 | 5/1976 | Doughty et al. | 106/277 |
| 4,007,127 | 2/1977 | Smadja et al. | 106/277 |
| 4,018,730 | 4/1977 | McDonald | 260/17.4 R |
| 4,523,957 | 6/1985 | Graf et al. | 106/281 R |

Primary Examiner—Paul Lieberman
Assistant Examiner—Willie J. Thompson
Attorney, Agent, or Firm—S. R. La Paglia; R. C. Gaffney; J. J. DeYoung

[57] ABSTRACT

Disclosed is a cationic bituminous emulsion comprising relative to the emulsion about 40 to 70% by weight asphalt, 0.25 to 5% by weight of a cationic emulsifier, 0.1–0.5% by weight of a water-soluble thickening agent, 0–8% of a low-boiling hydrocarbon, and water as a continuous phase of said emulsion to make up 100% by weight. The emulsion is particularly useful for open-graded roads.

3 Claims, No Drawings

OPEN-GRADE ASPHALT EMULSION MIXES

BACKGROUND OF THE INVENTION

Field of the Invention

This application relates to open-graded, emulsified asphalt pavements, compositions suitable for their preparation, and methods for their preparation.

Open-graded pavements are generally defined in the paving art as aggregate blends or asphalt mixtures which have high voids content. The pavements may be prepared with either hot-mix asphalt or with asphaltic emulsions. They possess the characteristics of relatively low cost, and the ability to allow water drainage through the pavement structure. This last feature makes the pavements particularly desirable for overlays on existing high-speed highways to prevent "hydroplaning" vehicle skids caused by a film of water created between a smooth pavement surface and the tire surface.

The open-graded, emulsified asphalt pavements are of particular interest in remote areas far from plants where hot-mix asphalts are available. With the use of the emulsified asphalts, blending of the emulsions with the aggregates may be performed in blending plants set up easily in the remote areas.

With the use of emulsified asphalts in constructing open-graded pavements, several problems have, however, arisen. Because of the porous nature of the mix, the use of conventional slow setting emulsions (SS type) is not feasible. In such case, substantial amounts of the emulsion will drain from the structure (runoff) before setting occurs, resulting in loss of asphalt. The onset of rain before complete set occurs will result in the loss of even more asphalt from the pavement (washoff). Both runoff and washoff result in loss of strength in the pavement and possible environmental contamination. Therefore, to reduce these problems, the emulsions used in these applications have been weakly stabilized medium setting (MS type) so designed that they "break" when mixed with the aggregate. However, because of this early break, incomplete coating of the aggregate and poor adhesion of the asphalt and aggregate often occurs. In most cases, these results have been ameliorated by the addition of substantial quantities (5-15%, usually 8-10%, by weight relative to the weight of emulsion) of petroleum naphtha to the mixes. This results in softening of the asphalt providing better coverage and adhesion.

With the use of naphtha, new problems have arisen. First, the cost is high for the naphtha which is simply lost to the atmosphere by evaporation. Second, evaporation of the naphtha raises possible air pollution problems. Third, the hazard of fire during the operation is enhanced. Fourth, because naphtha softens the asphalt, the pavement requires considerable time to achieve full strength, and the use of heavy vehicles on the pavement before full strength is achieved may result in rutting of the surface. Therefore, it is desirable to produce open-graded emulsified asphalt paving mixes which display good aggregate coating properties and achieve desirable runoff and washoff characteristics without the use of naphtha, and form pavements which develop their full strength rapidly.

U.S. Pat. No. 4,523,957 discloses low naphtha content open graded asphalt emulsions containing ionic polyelectrolytes.

U.S. Pat. No. 4,548,966 discloses an asphalt emulsion containing a modified starch consisting of not more than about 27 percent amylose and the balance substantially amylspectin. The modified starches disclosed in this patent are waxy or cross-linked starches which are substantially insoluble in water.

SUMMARY OF THE INVENTION

Disclosed is a cationic bituminous emulsion comprising relative to the emulsion about 40 to 75% by weight asphalt, 0.25 to 5% by weight of a cationic emulsifier, 0.1–0.5% by weight of a water-soluble thickening agent, 0–8% of a low-boiling hydrocarbon, and water as a continuous phase of said emulsion to make up 100% by weight.

DETAILED DESCRIPTION OF THE INVENTION

This invention is based on the discovery that including a water-soluble thickening agent in the emulsion extends the working time before the emulsion breaks and the mix stiffens in the absence of high levels of naphtha. In this way, open-graded aggregates and emulsions can be mixed, placed, and rolled with little interruption of traffic and without exceeding proposed limits on naphtha emissions.

The emulsified asphalt composition of this invention contains little or no naphtha and can be used for the same purposes as the conventional systems. The new composition is a cationic asphalt-water emulsion comprising the following proportions by weight:

(a) 40–75% asphalt, preferably 60 to 70%;
(b) 0.25–5% cationic emulsifier(s), preferably 0.4 to 2%;
(c) 0.1–0.5% thickening agent, preferably 0.2 to 0.4%;
(d) 0 to 8% of a low-boiling hydrocarbon, preferably 0 to 3% and more preferably less than 2%; and
(e) the balance, water.

The emulsion is formed in the usual way. A water solution containing the emulsifier(s) and thickening agent is combined with heated asphalt (generally 240° F. to 280° F.) in an emulsion mill. Alternatively, the cationic emulsion can be formed with asphalt and emulsifier solution alone and the thickening agent added to the final emulsion. No special equipment or process steps are needed to prepare these emulsions.

The Asphalt

The asphalt may be a natural bitumen, a residuum from crude oil distillation, and/or solvent deasphalting or an air-blown product. It generally is a material defined by its penetration range at 77° F., e.g., 100 to 250, 40 to 90. The asphalt will be present in the emulsion in the amount of from about 40 to 75%, preferably 60 to 70%, by weight relative to the emulsion. The balance of the emulsion will be water to make 100%.

The Emulsifiers

The emulsion is prepared by mixing molten asphalt and an aqueous solution of emulsifier under high shear at elevated temperature. Preferred are the cationic emulsifiers.

One type of suitable asphalt emulsion is prepared with cationic emulsifiers. Among those are the emulsions described in U.S. Pat. Nos. 3,026,266, 3,096,292, 3,220,953, and 3,445,258. Any suitable cationic emulsifier capable of emulsifying bitumen in water may be used including cation active salts of quaternary nitrogen bases, salts of fatty amines, preferably straight-chain primary fatty mono and diamines, amidoamine salts, such as amidoamine hydrochloride of stearic acid, etc., the hydrohalide salts of aminoamides of polyalkylene polyamines such as tetraethylene pentamines and fatty acids, etc. Another class of suitable emulsifiers is that including the salts of ethylene oxide adducts of fatty diamines and of the ethylene oxide adducts of hydrocarbon-substituted imidazolines. This list is, of course, only illustrative, and not inclusive. The use of mixture of the various cationic emulsifiers is also contemplated. The preferred cationic emulsifiers are those described as the salts of quaternary nitrogen bases disclosed in U.S. Pat. No. 3,220,953. These compounds are those materials of the preferred formula

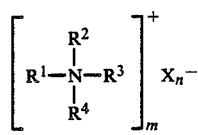

in which $R^1$, $R^2$, $R^3$ and $R^4$ are organic radicals, each having a carbon-nitrogen linkage to the nitrogen atom, X is an anion whose valence does not exceed 2, and m and n are small integers which indicate the molar proportions of the cation and anion required to form the respective salt. Preferred emulsifying salts are those in which the organic radicals $R^1$, $R^2$, $R^3$ and $R^4$ are alkyl, alkenyl, hydroxy alkyl, arylalkyl or alkylaryl radicals of 1 to 24 carbons atoms or heterocyclic groups of 4 to 10 carbon atoms in which from 2 to 3 of the nitrogen valences are shared by two carbon atoms in a single heterocyclic group. In all of these salts of quaternary nitrogen bases suitable for use as cationic emulsifiers in the preparation of oil-in-water type emulsions the aggregate number of carbon atoms in the cationic portion of their molecule should be large enough to impart oil solubility and emulsifying properties, and preferably should be equal to and not less than 15 and not more than 30 carbon atoms. In other words, this class of cationic quaternary nitrogen-containing compounds is formed by salts of tetra-substituted ammonium bases and by salts of heterocyclic nitrogen bases, such as pyridinium, quinolinium, isoqunilinium, morpholinium, piperidinium, imidazolinium, and other like quaternary nitrogen-containing bases. The anion may be either a halide (X—), a methosulfate ($SO_4CH_3$—), a nitrate ($NO_3$—) or the like ion. Monovalent anions are preferred, particularly the halide anions.

Numerous cationic quaternary nitrogen-containing emulsifiers may be employed for the preparation of cationic oil-in-water type emulsions. Among them, to mention but a few, are:

N,N-dimethyl-N-benzyl-N-octadecyl ammonium chloride,
N,N-dimethyl-N-hydroxyethyl-N-dodecyl ammonium chloride
N,N-dimethyl-N-benzyl-N-octadecenyl ammonium chloride
N,N-dimethyl-N-benzyl-N-dodecyl ammonium chloride,
N,N-dimethyl-N-hydroxyethyl-N-benzyl ammonium chloride,
Hexadecyl pyridinium chloride,
Hexadecyl triethyl ammonium bromide,
Octadecylbenzyl trimethyl ammonium methosulfate,
Isopropylnaphthyl trimethyl ammonium chloride,
Octadecyl pyridinium bromide, 1-(2-hydroxyethyl)-2-heptadecenyl-1-(4-chlorobutyl)imidazolinium chloride,
Hexadecyl methyl piperidinium methosulfate,
Dodecyl hydroxyethyl morpholinium bromide.

Among the quaternary nitrogen-containing materials available in commerce as cationic emulsifiers for the preparation of oil-in-water type emulsions, there are quaternary ammonium salts, such as quaternary ammonium halide materials sold by General Mills under the trademark "ALIQUAT"; materials sold by Armak Company under the several "ARQUAD" trademarks; certain quaternized materials developed and sold by the Society of Chemical Industry, in Basel, Switzerland, under the several "SAPAMINE" trademarks, and many others.

The active cationic component of these materials contains the characteristic positively charged quaternary nitrogen configuration

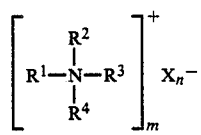

in which the aggregate of carbon atoms of $R^1$, $R^2$, $R^3$ and $R^4$ is sufficient to impart oil solubility and emulsifying properties, and preferably is equal to not less than 15 and not more than 30 carbon atoms.

Best emulsification can be achieved with those among the aforesaid quaternary nitrogen-containing materials in which the active cationic component contains at least one long aliphatic hydrocarbon chain of not less than 12 and not more than 24 carbon atoms, such as an alkyl or an alkenyl chain. This latter chain may be derived from a mixture of organic materials such as tallow, soybean oil, lard, etc.

The emulsifier material may consist entirely of an active cationic salt of a quaternary nitrogen base, or may also contain some impurities, such as acyl chlorides and amines. It may also be employed in the form of a concentrated aqueous solution and may contain auxiliary stabilizers in amounts conventionally employed in the trade.

Among the available commercial emulsifier materials of this type, the following may be employed for the preparation for cationic emulsions in accordance with the invention:

HYAMINE 2389. This is the trademark of a product of Rohm and Haas Chemical Company, of Philadelphia, Pa., for N-alkyl methyl benzyl-N,N,N-trimethyl ammonium chloride, which has the following formula

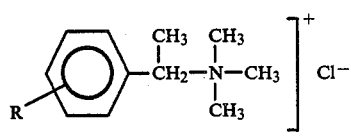

wherein R averages about 12 carbon atoms.

(2) ARQUAD T. This is the trademark of a product of Armak Compeny of Chicago, Ill., for $C_{14}$–$C_{18}$ alkyl trimethyl ammonium chloride, which has the following formula:

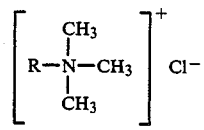

wherein R is a long alkyl chain derived from tallow.

(3) HYAMINE 1622. This is the trademark of a product of Rohm and Haas Chemical Company of Philadelphia, Pa., for di-isobutyl phenoxyethoxy ethyl dimethyl benzyl ammonium chloride monohydrate of the formula:

$$[CH_3.C(CH_3)_2.CH_2(CH_3)_2.C_6H_5.OCH_2CH_2.OCH_2—CH_2N(CH_3)_2.CH_2C_6C_6H_5]^+Cl^-$$

(4) ARQUAD S. This is the trademark of product of Armak Company of Chicago, Ill., for $C_{16}C_{18}$ alkyl trimethyl ammonium chloride, which has the formula:

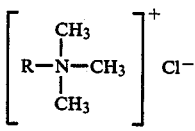

wherein R is a long alkyl chain derived from soybean oil.

It is believed that minor amounts of the starting materials ordinarily are present in the aforementioned emulsifiers as impurities of no consequence to their operativeness according to the invention.

These and other suitable cationic emulsifiers may be employed in varying amounts, generally from about 0.25 to about 5%, and preferably from about 0.40 to about 2% of the active cationic component, based on the weight of the finished emulsion, although more or less may be employed depending upon factors such as the cost of the emulsifier, its effectiveness as an emulsifying agent, the amount of bitumen dispersed, etc.

The Water-Soluble Thickening Agent

The water-soluble thickening agents used in the compositions of this invention are well known. They are compounds which, upon dissolving in water at low concentrations, cause a very dramatic increase in emulsion viscosity. Among the compounds having this property are the guar gums, high molecular weight polyethylene glycol, ethoxylated polyvinyl alcohol, hydroxy ethyl cellulose, ethoxylated cellulose, ethoxylated sorbitol, etc. Representative water-soluble cellulose ethers include sodium carboxymethyl cellulose, sodium carboxymethyl 2-hydroxyethyl cellulose, 2-hydroxyethyl cellulose, methyl cellulose, 2-hydroxypropyl methyl cellulose, 2-hydroxyethyl methyl cellulose, 2-hydroxybutyl methyl cellulose, 2-hydroxyethyl ethyl cellulose, 2-hydroxypropyl cellulose, etc. The preferred material is hydroxy ethyl cellulose made by reacting cellulose with ethylene oxide. Based on total emulsion weight, the concentration of the thickening agent varies from 0.1% to 0.5%, preferably from 0.2% to 0.4%.

The Low-Boiling Hydrocarbon

The emulsion can contain from 0 to 8 weight percent lower-boiling hydrocarbons, preferably 0 to 3 weight percent and more preferably less than 2 weight percent. By lower-boiling hydrocarbons it is meant naphtha and other lower-boiling hydrocarbons which have commonly been used in asphalt emulsions. More preferably, the emulsion is essentially free of naphtha and other lower boiling hydrocarbons. By "essentially free" it is meant less than 1% by weight relative to the weight of the emulsion and preferably less than 0.1% by weight.

The Aggregate

Suitable aggregates for use with the emulsions of this invention include a wide variety of siliceous and calcareous materials. As previously mentioned, the socalled "open-graded" aggregates are preferred.

The open-graded asphalt mixes are described in "Design and Construction of Emulsified Asphalt Open Grade Mixes and Overlays" by L. D. Coyne presented at the Twenty-Third Annual Road Builders Clinic, University of Idaho, Moscow, Id., Mar. 17, 1972. Such a mix is generally defined as an aggregate blend or asphalt mixture which has a high voids content, usually lacking in fine aggregates (sand) and mineral fillers. Federal Highway Administration, Region 10, Emory Richardson, W. A. Liddle, "Experience in the Pacific northwest with Open Graded Emulsified Asphalt Pavements" defines the open-graded asphalt-paving mixes characterized by the use of asphalt emulsion, aggregates as crushed stone or crushed gravel aggregate with less than 10 percent passing the No. 10 sieve and 20 to 30 percent air voids in the compacted pavement. A consistent aspect of almost all definitions of open-graded aggregate is that less than 2 percent passes a No. 200 screen. The aggregate should preferably be relatively clean, that is, the presence of substantial quantities of dust will require higher quantities of emulsifier in the mixes.

Combination of the Emulsion and Aggregate

The emulsion is combined with the aggregate by conventional means. The water-soluble thickening agent extends the working time before the emulsion breaks and the mix stiffens in the absence of high levels of naphtha.

The paving composition will contain about 3 to 20, preferably 5 to 10, percent by weight of emulsion and about 97 to 80, preferably about 95 to 90 percent by weight of open-graded aggregate based on the weight of said paving composition.

EXAMPLES

The following examples illustrate this invention. The examples are only illustrative and are nonlimiting.

Example 1

Preparation of the Water-Soluble Thickened Asphalt Emulsion

Ten (10) parts of cold water was mixed with 0.30 parts of a water soluble thickener, a hydroxy ethyl ether of cellulose, Natrosol 250H4BR, manufactured by Hercules Inc., in a tank No. 1. The mixture was agitated for 2 minutes, then pumped to a tank No. 2. In tank No. 1 ten (10) parts water were mixed with one (1) part of an emulsifier, Tyfo K, purchased from National Research Chemicals Co. which is believed to be an $C_{12}$-$C_{18}$ imidazoline trimethyl ammonium chloride and heated to 40° F. 0.76 parts HCl (32 baume) was added to tank No. 1 and agitated for 10 minutes. The material in Tank No. 1 was then pumped to tank No. 2 and agitated. 9.94 parts water was added to tank No. 2 and agitated. The pH was adjusted to 2.48 with HCl. The mixture was heated to 99° F.

Sixty-five (65) parts of soft emulsion base asphalt (Wilbridge, Oreg.) at 262° F. were combined with the water mixture above in a colloid mill. To the resulting asphalt emulsion was added three (3) parts hydrocarbon naphtha.

Coating the Aggregate

In a Calenco pug mill 92.9 parts aggregate consisting of aggregate passing through a ½ inch sieve and collected on a No. 4 sieve with 0.3 percent passing the No. 200 sieve and 0.5 parts natural moisture were mixed with 6.6 parts of the emulsion described above.

Placing the Pavement

The above mixture was placed on a test strip using a Cedar-Rapids paving machine. A ten (10) ton Ingram steel roller was used immediately upon laydown to compact the mixture. A fine aggregate (choke) was then placed over the road to prevent the mixture from being picked up by tires.

Example 2

Asphalt emulsions substantially as described above were tested in the laboratory with and without a thickener and with and without various amounts of naphtha ranging from zero percent up to a maximum amount of 8 percent naphtha. When mixed with typical open-graded aggregate the emulsions with less than 3% naphtha and without the water-soluble thickener added did not coat the aggregate well. The resulting mixes were stiff and hard to place. With the addition of a thickener to the emulsions (Natrosol 250H4BR) the system coats and mixes much better providing a aggregate/asphalt emulsion suitable for paving. The degree of coating was determined by mixing the emulsion with aggregate using a spoon and bowl. A visual determination was made as to how much emulsion and/or asphalt coated the aggregate. The stiffness of the emulsion/aggregate mixture was determined by pulling a standard sized disk through a specific amount of the test aggregate/asphalt emulsion mixture and measuring the pull force. Systems with low naphtha contents (3 percent or less) and no thickener give high "pull values" which indicates a stiff mix which is not suitable for paving.

As will be evident to those skilled in the art, various modifications in this invention can be made or followed, in the light of the foregoing disclosure and discussion, without departing from the spirit or scope of the disclosure or from the scope of the following claims.

What is claimed is:

1. A paving composition consisting of about 80 to 97% by weight of an open-graded aggregate and 3 to 20% by weight of a cationic bituminous emulsion, said emulsion comprising, relative to the emulsion, about 60 to 70% by weight asphalt, 0.4–2% by weight of a cationic emulsifier, 0.2–0.4% by weight of a water-soluble thickening agent, the presence of a low-boiling hydrocarbon in amounts of less than 2% by weight of low-boiling hydrocarbon, and water as a continuous phase of said emulsion to make up 100% by weight.

2. The emulsion of claim 1 wherein said thickening agent is selected from guar gums, high molecular weight polyethylene glycol, ethoxylated polyvinyl alcohol, ethoxylated cellulose, and ethoxylated sorbitol.

3. The emulsion of claim 2 wherein said composition is essentially free of low boiling hydrocarbons.

* * * * *